United States Patent
Kishida et al.

(10) Patent No.: US 10,612,947 B2
(45) Date of Patent: Apr. 7, 2020

(54) DISTRIBUTED PRESSURE, TEMPERATURE, STRAIN SENSING CABLE USING METAL WIRES WITH SLOT GROOVES AND OPTICAL FIBERS IN THE SLOT GROOVES

(71) Applicant: NEUBREX CO., LTD., Chuo-ku, Kobe-shi, Hyogo (JP)

(72) Inventors: Kinzo Kishida, Kobe (JP); Yoshiaki Yamauchi, Kobe (JP)

(73) Assignee: NEUBREX CO., LTD., Kobe-Shi, Hyogo (JP)

(*) Notice: Subject to any disclaimer, the term of this patent is extended or adjusted under 35 U.S.C. 154(b) by 43 days.

(21) Appl. No.: 15/758,392

(22) PCT Filed: Oct. 6, 2015

(86) PCT No.: PCT/JP2015/078299
§ 371 (c)(1),
(2) Date: Mar. 8, 2018

(87) PCT Pub. No.: WO2017/060971
PCT Pub. Date: Apr. 13, 2017

(65) Prior Publication Data
US 2018/0252556 A1    Sep. 6, 2018

(51) Int. Cl.
*G01D 5/353* (2006.01)
*G02B 6/44* (2006.01)
(Continued)

(52) U.S. Cl.
CPC ......... *G01D 5/35374* (2013.01); *G01D 5/268* (2013.01); *G01D 5/35358* (2013.01);
(Continued)

(58) Field of Classification Search
CPC .......... G01D 5/35374; G01D 5/35358; G01D 5/268; G01D 5/3537; G01D 5/353;
(Continued)

(56) References Cited

U.S. PATENT DOCUMENTS

| | | | |
|---|---|---|---|
| 2006/0250274 A1* | 11/2006 | Mombourquette | ... E21B 47/065 340/854.9 |
| 2012/0205103 A1* | 8/2012 | Ravi | ........................ E21B 33/14 166/285 |

(Continued)

FOREIGN PATENT DOCUMENTS

| | | |
|---|---|---|
| JP | 8-226857 A | 9/1996 |
| JP | 2004-109039 A | 4/2004 |

(Continued)

OTHER PUBLICATIONS

International Search Report (PCT/ISA/210) dated Jan. 12, 2016, by the Japanese Patent Office as the International Searching Authority for International Application No. PCT/JP2015/078299.

(Continued)

*Primary Examiner* — Que Tan Le
*Assistant Examiner* — Jennifer D Bennett
(74) *Attorney, Agent, or Firm* — Buchanan Ingersoll & Rooney PC

(57) ABSTRACT

A distributed pressure, temperature, strain (DPTS) sensing cable includes at least two slotted fiber optic metal wires each having a slot groove extended along in an outer circumference of the wires to encapsulate optical fibers in the slot grooves. The two slotted fiber optic metal wires have characteristics different from each other.

8 Claims, 10 Drawing Sheets

(51) Int. Cl.
*G01D 5/26* (2006.01)
*G01K 11/32* (2006.01)
*G01B 11/16* (2006.01)
*H01B 9/00* (2006.01)

(52) U.S. Cl.
CPC ............ *G02B 6/4416* (2013.01); *G01B 11/16* (2013.01); *G01K 11/32* (2013.01); *H01B 9/005* (2013.01)

(58) Field of Classification Search
CPC .......... G02B 6/44; G02B 6/4463; G02B 6/50; G02B 2006/12107; G02B 6/4416; G01K 11/32; G01B 11/16; G01L 1/24; H01B 9/005
See application file for complete search history.

(56) References Cited

U.S. PATENT DOCUMENTS

| | | |
|---|---|---|
| 2013/0209044 A1 | 8/2013 | Lowell et al. |
| 2014/0226938 A1 | 8/2014 | Hashimoto et al. |
| 2014/0367121 A1* | 12/2014 | Varkey ................. E21B 47/123 166/385 |
| 2015/0141843 A1* | 5/2015 | Eberle ................ A61B 5/02154 600/478 |
| 2015/0211900 A1 | 7/2015 | Xue et al. |
| 2015/0285626 A1 | 10/2015 | Yamauchi et al. |
| 2017/0123103 A1* | 5/2017 | Tsakalakos ......... E21B 47/1005 |

FOREIGN PATENT DOCUMENTS

| | | |
|---|---|---|
| JP | 2007-176426 A | 7/2007 |
| JP | 2008-139238 A | 6/2008 |
| JP | 2011-53146 A | 3/2011 |
| JP | 2015-501420 A | 1/2015 |
| WO | WO 2014/027592 A1 | 2/2014 |
| WO | WO 2014/083989 A1 | 6/2014 |

OTHER PUBLICATIONS

Kishida et al., "Study of Optical Fibers Strain-Temperature Sensitivities Using Hybrid Brillouin-Rayleigh System", Photonic Sensors, vol. 4, No. 1, 2014, pp. 1-11.

Wojcik et al., "V type high birefringent PCF fiber for hydrostatic pressure sensing", Photonics Letters of Poland, vol. 2(1), 2010, pp. 10-12.

Office Action dated Nov. 22, 2019, by the Chinese Patent Office in corresponding Chinese Patent Application No. 201580083595.4 and English translation of the Office Action. (10 pages).

* cited by examiner

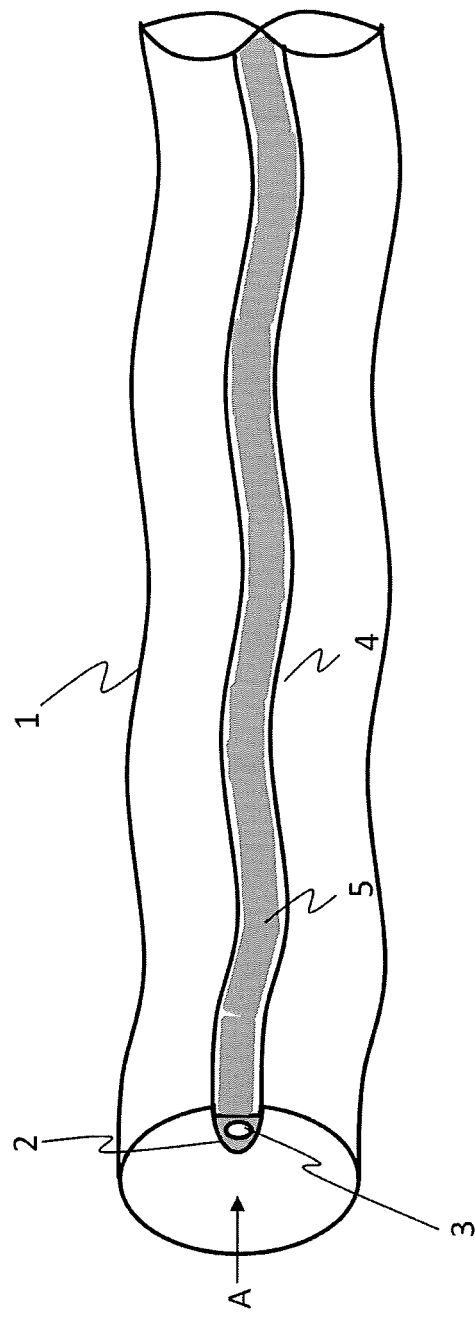
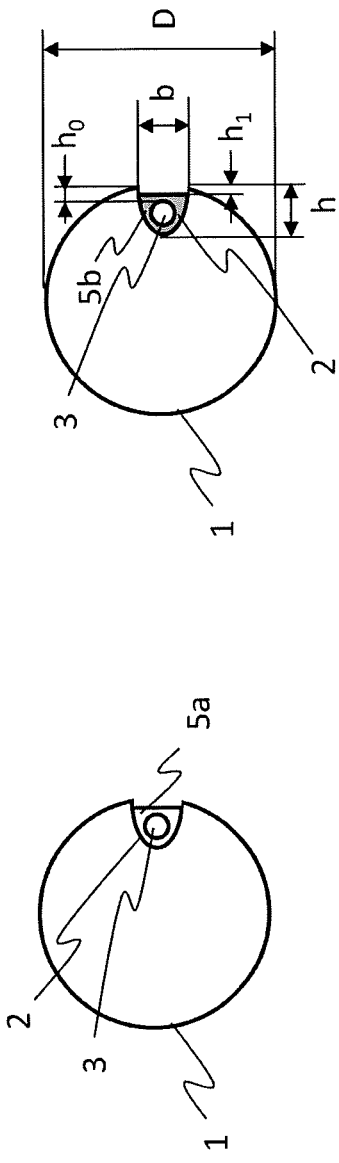
FIG.1A
FIG.1B
FIG.1C

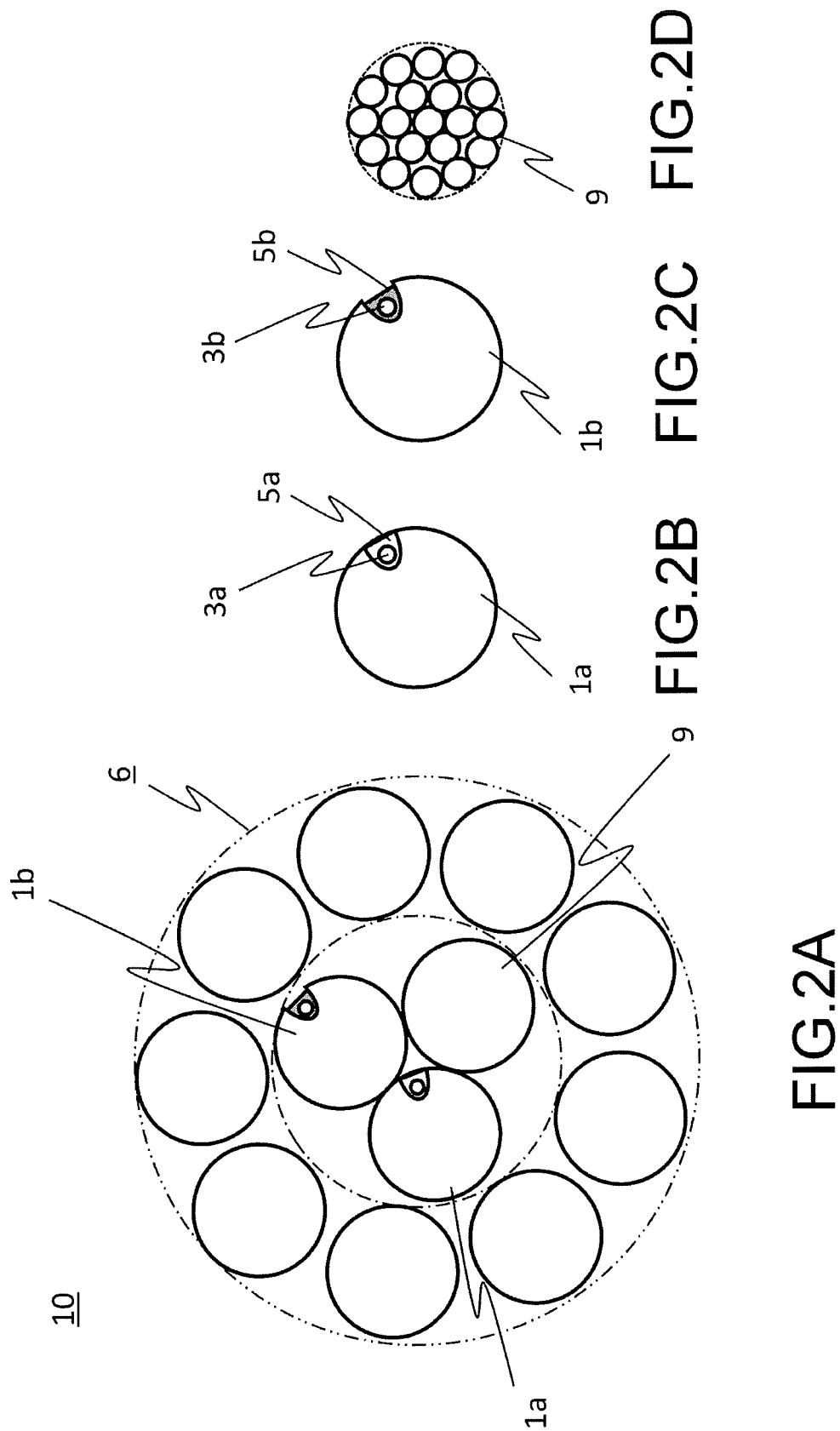

DISTRIBUTED PRESSURE, TEMPERATURE, STRAIN SENSING CABLE USING METAL WIRES WITH SLOT GROOVES AND OPTICAL FIBERS IN THE SLOT GROOVES

TECHNICAL FIELD

The present invention relates to a fiber optic cable that is alternative to a traditional fiber optic cable including a fiber in metal tube (FIMT) and is easy to fabricate, for example, assembling and stranding, and capable of measuring continuous distributions of pressure, strain, and the like using an optical fiber.

Background Art

The FIMT, which is an optical fiber sheathing metal-tube core, has been conventionally used in a variety of fields including a radiation thermometer because having advantages in that it can sheathe a plurality of optical fiber elements and exhibits a good sealing performance against water or hydrogen gas and necessary mechanical strength such as tensile strength without reinforcement and the like, and further because the FIMT sheathed optical fiber subjected to no pressure force has capability of a temperature sensor and is able to measure a long-distance continuous temperature distribution along the optical fiber.

There is an optical fiber buffer tube, as an example of such the FIMT, that is usable under high temperature conditions. The optical fiber buffer tube is provided with an optical fiber as a high temperature sensor operable under high temperatures of at least 200° C. or higher, such as 350° C. There is also a fiber optic cable that includes the foregoing optical fiber buffer tube and a high conductivity conductor (see, for example, Patent Document 1).

Further, there is another example in which an optical fiber strain sensor is inserted in a sensor accommodating groove formed longitudinally in an overhead trolley wire to detect a possible breakage portion in a long section of the trolley wire by measuring heat generation caused by the current flowing through a portion reduced in cross section due to long-term wear of the trolley wire (see, for example, Patent Document 2). This example further describes a method of measuring strain of the optical fiber. In the example, the optical fiber is inserted with deficient length in a metal tube, in other words, the optical fiber having a length shorter than that of the metal tube is sheathed with a gap space under no tensile condition, and the metal tube is discretely fixed to the trolley wire longitudinally along the trolley wire at intervals of about 10 cm to 4 m with a tensile condition of the metal tube. In addition, since an optical fiber can measure both temperature and strain, there is also a method for improving reliability of the measurement by so called double parameter monitoring, i.e., by concurrently monitoring temperature information and strain information.

Another example points out that successful strain or temperature measurement is very limited in industrial distributed fiber optic sensing fields (see, for example, Non-Patent Document 1). This is due to the fact that commercially available sensing systems mismatch actual industrial requirements with respect to, in particular, spatial resolution and accuracy (there is generally a trade-off between, for example, spatial resolution and temperature resolution). The example also shows a hybrid Brillouin-Rayleigh backscatter measurement system that exceeds the ability of a measurement method using strain gauges, and illustrates the principle of this measurement system with consideration of the fiber calibration methodology and derives and discusses expressions for determining strain, temperature, and hydropressure. The example additionally shows that a hysteresis occurs in the relation between temperature and Brillouin frequency shift, or temperature and Rayleigh frequency shift, and further shows the effect of the thickness of a protective coating for the optical fiber.

PRIOR ART DOCUMENT

Patent Document

Patent Document 1: US2013/0209044 A1,
Patent Document 2: JP2007-176426 A, and
Patent Document 3: WO2014/083989 A1.

Non-Patent Document

Non-Patent Document 1: K. KISHIDA, et al., "Study of Optical Fibers Strain-Temperature Sensitivities Using Hybrid Brillouin-Rayleigh System", PHOTONIC SENSORS, Vol. 4, No. 1, 2014, pp. 1-11, and
Non-Patent Document 2: J. Wojcik, et al., "V type high birefringent PCF fiber for hydrostatic pressure sensing", PHOTONIC LETTERS OF POLAND, Vol. 2(1), 2010, pp. 10-12.

SUMMARY OF THE INVENTION

Problem That the Invention is to Solve

A measurement using a distributed pressure, temperature, and strain system (DPTSS) has been implemented hitherto by providing at least respective ones of an optical fiber that is subjected to no pressure and another optical fiber that is subjected to pressure. And an FIMT is employed for inserting in a metal tube the optical fiber subjected to no pressure. However, since a traditional FIMT, which is an optical fiber sheathing metal-tube core, has an outer diameter of about 0.8 mm to several mm and a thickness of 0.1 mm to 0.2 mm, the tube is likely to break, thus leading to difficulty in fabricating a long fiber optic cable. Particularly, in a case of stranding with a plurality of FIMTs having an outer diameter of about 1 mm, the thickness of the tube needs to be 0.1 mm or less, thus causing the stranding process to be difficult owing to mechanical strength and the like.

Although a traditional FIMT has a high sealing performance, its pressure blocking capability is lost if even one pinhole exists in the sheathing metal tube, raising a problem of not being able to perform pressure measurement with high precision. If there is a pinhole, the measurement object fluid enters into the FIMT through the pinhole and no pressure difference is established between the inside and outside of the FIMT, thus causing the pressure measurement to be impossible. A 100% detection of pinholes is actually difficult in fabrication of an FIMT having a length of several km and also involves a cost problem. While there is also a method for relieving the internal pressure by opening an above-ground portion of the FIMT, the method does not necessarily guarantee the relieving effect because the FIMT is ordinarily filled with grease.

Further, there is a fiber optic cable having a traditional FIMT, for measuring pressure, strain, and temperature. The cable includes, for example, fiber optic core for measuring the pressure of a measurement object and an FIMT in the armored cable around the core, for measuring the temperature thereof, in which fixing members for fixing the fiber optic core and the armored cable to each other are disposed at intervals along the fiber optic cable so as to form an annular clearance space between the fiber optic core and the armored cable.

In order to measure precisely strain of the measurement object, the fiber optic cable needs to fix the fiber optic core and the armored cable to each other with the fixing members disposed at predetermined intervals, thus posing a problem of not being able to measure precisely pressure of the measurement object at the positions of the fixing members. Moreover, in a case of a multilayer armored cable, there also raises a problem of not being able to measure a precise strain distribution when a deviation occurs between the strain of the armored cable and that of the fiber optic core owing to a relative slippage between each layer.

The present invention is made in light of above problems and aimed at providing a distributed pressure, temperature, strain (DPTS) sensing cable that causes no pinhole problem and almost no possibility of metal tube breakage or the like because of no FIMTs employed, and further that is easy to fabricate because of easy assembly of multiple wires used and is capable of measuring a continuous stain distribution.

Means for Solving the Problem

A distributed pressure, temperature, and strain (DPTS) sensing cable according to the present invention is for measuring distributions of pressure, strain, and temperature of a measurement object on the bases of frequency changes in Brillouin and Rayleigh scattering of laser pulse light emitted into the optical fibers, the DPTS sensing cable includes at least two metal wires each having a slot groove extended along in an outer circumferential portion of the wire to encapsulate an optical fiber, wherein one of the slotted fiber optic metal wire has a pressure sensitivity characteristic for frequency changes in Brillouin and Rayleigh scattering, different from that of the other the slotted fiber optic metal wire.

Advantage of the Invention

The present invention is able to eliminate the pinhole problem entirely and the necessity of special laser welding and thereby enables quick and economic fabrication of a fiber optic cable, in comparison to a case of using a traditional fiber optic cable including a fiber in metal tube (FIMT), thus improving assembly of the cable configuration. Moreover, the pressure blocking capability is not lost. Furthermore, the present invention enables a continuous strain distribution measurement, which has been impossible by a traditional fiber optic cable that is a DPTS sensing cable provided with fixing members.

BRIEF DESCRIPTION OF THE DRAWINGS

FIGS. 1A, 1B, 1C are diagrams showing an exemplary basic structure of a slotted fiber optic wire used for a DPTS sensing cable according to the embodiment 1 of the present invention;

FIGS. 2A, 2B, 2C, 2D are diagrams showing an exemplary configuration of the DPTS sensing cable according to the embodiment 1 of the present invention;

EMBODIMENTS FOR CARRYING OUT THE INVENTION

Embodiment 1

Figure 3:
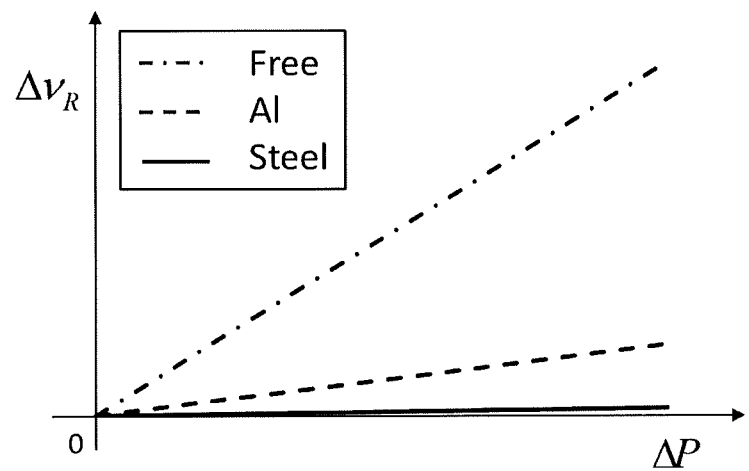
FIG. 3 is a graph showing examples of the pressure change vs. Rayleigh scattering frequency change relations due to difference in material for coupling the optical fiber.

The embodiment 1 of the present invention is described hereinafter with reference to the accompanying drawings. Before describing a specific example of the present embodiment, a basic structure of a distributed pressure, temperature, and strain (DPTS) sensing cable 10 is described first with reference to FIGS. 1A, 1B, and 1C. FIGS. 1A to 1C are diagrams showing an exemplary basic structure of a slotted fiber optic metal wire, a metal wire used for the DPTS sensing cable 10 according to the embodiment 1 of the present invention. FIG. 1A is a conceptual diagram of the basic structure of the slotted fiber optic wire 1, and FIGS. 1B and 1C are cross-sectional diagrams taken in the direction of the arrow A in FIG. 1A, perpendicular to the axis of the slotted fiber optic wire 1. In the example shown in FIGS. 1A to 1C, a concave slot is extended longitudinally in an outer circumference of the slotted fiber optic wire 1, and an optical fiber 3 is encapsulated in the slot groove 2 having a U-shaped cross section in a plane perpendicular to the axis of the slotted fiber optic wire to hold the optical fiber longitudinally throughout the length of the slotted fiber optic wire 1 by resin or other material (hereinafter referred to as an optical fiber holder 4). The present invention proposes two types of slotted fiber optic wires having respective basic structures exhibiting different pressure sensitivities.

A first basic structure (also referred to as a "type-1 structure" hereinafter) is such that the optical fiber holder 4 is formed of a water-soluble coat 5a to hold (encapsulate) the optical fiber in the slotted wire (see FIG. 1B). The wire having the first basic structure can be handled as one wire when stranded, and allows for fabricating the DPTS sensing cable. The water-soluble coat is dissolved after the cable is completed, whereby the DPTS sensing cable as a whole has a pressure sensitivity. A second basic structure (also referred to as a "type-2 structure" hereinafter) is such that the optical fiber holder 4 is formed of an adhesive 5c or the coating of the optical fiber is formed of an elastic material 5d to hold (encapsulate) the optical fiber in the slot groove of the wire by utilizing adhesive effect of the adhesive or elastic effect of the coating (see FIG. 1C). The wire having the second basic structure can also be handled as one wire when stranded, and allows for fabricating the DPTS sensing cable. These are the same as with the wire having the first basic structure. In pressure measurement, however, the optical fiber in the second basic-structure wire receives only a part of static pressure around the cable. Accordingly, the pressure sensitivity of the optical fiber is different from that of the optical fiber in the first basic-structure wire because of difference in the cross-sectional shapes of the slot grooves and coupling to the wires. Thus, the DPTS sensing cable of the present embodiment is fabricated with the above two type wires encapsulating the optical fibers.

Note that an encapsulating depth $h_0$ shown in FIG. 1C is set larger than a radial deformation amount of the slotted fiber optic wire in actual use. Accordingly, even though the slotted fiber optic wire 1 suffers a torsional distortion longitudinally about its axis, the distortion exerts no adverse effect on the measurement with the optical fiber 3. In this figure, D expresses the diameter of the slotted fiber optic wire; b, the opening width of the U-shaped slot groove at the outermost radial position of the slotted fiber optic wire; and h, the depth of the U-shaped slot groove, and they are respectively set to D=1.17 mm; b=0.3 mm; and h=0.3 mm, for example. To be more specific, a step depression is formed in the opening of the U-shaped slot groove. Hereinafter, the step depression is simply referred to as "depression". Based on the above, a specific example of the embodiment 1 is described in detail below.

FIGS. 2A, 2B, 2C, and 2D are diagrams showing an exemplary configuration of the DPTS sensing cable 10 using the slotted fiber optic wire 1, in which the cross sections are taken in the direction perpendicularly to the axis of the DPTS sensing cable. FIG. 2A is a diagram in cross section showing an arrangement of metal wires used for the DPTS sensing cable; FIGS. 2B, 2C, 2D each are partially enlarged diagrams of FIG. 2A.

As shown in FIG. 2A, the DPTS sensing cable 10 is typically characterized as having at least respective ones of the two types of wires different in their basic structures described above, and is configured in a cross-lay strand structure such that these two types of wires are arranged in a first layer, the inner layer (the layer within the dot-dash line in the figure) and enclosed by a second layer, the outer layer (the layer between the dot-dash line and the dot-dot-dash line in the figure).

A slotted fiber optic wire 1a shown in FIG. 2A is a metal wire having the first basic structure in which the optical fiber holder 4 is formed of the water-soluble coat 5a and the optical fiber 3a is encapsulated in the slot groove, as shown in the enlarged diagram of FIG. 2b. The water-soluble coat 5a dissolves in an aqueous solution, which is a measurement object, so that the optical fiber 3a is used in a non-constrained condition when used. Likewise, another slotted fiber optic wire 1b shown in FIG. 2A is a metal wire having the second basic structure in which the optical fiber holder 4 is formed of the adhesive 5c such as resin and an optical fiber 3b is encapsulated in the slot groove, as shown in the enlarged diagram of FIG. 2C. Hereinafter, the optical fibers encapsulated in the respective slot grooves are collectively referred to as "build-in fiber"; among them, the fiber used in the type-1 structure is called a P-fiber and that used in the type-2 structure, a B-fiber. FIG. 2D is a diagram for explaining a dummy cable 9 that is different from both of the above two types of metal wires. The dummy cable is formed of a plurality of stranded thin wires comparing with the slotted fiber optic wires 1a and 1b. In addition, a combination of metal wires is not limited to that shown in FIG. 2A. Any one of the slotted fiber optic metal wires 1a and 1b may be used instead of the dummy cable 9. While the above describes the exemplar that uses the water-soluble coat in fabrication of the optical fiber having coupling-free structure, in a case of the measurement object being an oil-based liquid such as petroleum, substituting an oil-soluble coat for the water-soluble coat allows the same effect to be brought about. Further, two slot grooves may be formed in the same one wire to encapsulate total two optical fibers one by one in the respective slot grooves.

In the measurement using such the slotted fiber optic wires, the DPTS sensing cable needs to be typically configured in a multilayers as shown in FIG. 2A. The multilayered structure is hereinafter referred to as a strand structure 6. Note that it is preferable that the metal wire having the type-1 structure is particularly arranged for the opening of the slot groove to face toward the center axis of the DPTS sensing cable.

The reason for that is as follows: in the measurement using this cable under fluid pressure conditions, the fluid ordinarily contains a proppant, i.e., a substance primarily consisting of sand. In the present embodiment, since the optical fiber is placed near the surface of the slotted fiber optic metal wire, the sand wears the surface of the metal wire, thus resulting in direct contact of the sand with the optical fiber and leading to the possibility of damaging the optical fiber. The multilayer structure according to the present invention exhibits a filtration capability of preventing ingress of sand as well as preserves the capability of measuring the fluid pressure. In addition, the more inner layer in the multilayer structure, the more effective the layer exhibits filtration capability.

The slotted fiber optic wires shown in FIGS. 2B and 2D are arranged in the multilayered strand structure 6. The strand structure employed here is typically called a cross-lay strand. The cross-lay strand, since it uses wires of substantially the same diameter, generally has characteristics of being cheap and easy to handle. The strand structure is configured such that the inner layer and the outer layer are different in helical pitch and the outer-layer wires are arranged to be in contact with the inner layer including the slotted fiber optic wires so as to cross the ridges and valleys of the inner layer. Accordingly, the cross-lay strand possibly cannot faithfully transfer the strain of the outer layer to a wire arranged in the center layer, but is stable in the cable structure. In addition, if there is no possibility of ingress of sand into the cable, a wire for measuring strain can be placed in the outer layer, thereby achieving effectively measurement of strain. While FIG. 2A shows as an exemplar the DPTS sensing cable configured with one outer layer only arranged outside the inner layer including the slotted fiber optic wires having the respective basic structures, the configuration is not limited to this. The DPTS sensing cable may have a strand structure configured with two or more outer layers. For example, in a case of two outer layers, the layer arranged with the slotted fiber optic wires having the basic structures is hereinafter referred to as "inner layer"; the layer just outside the inner layer, as "middle layer"; and the layer thereoutside, as "outermost layer".

A parallel-lay strand may be employed as another strand structure. The parallel-lay strand is generally formed by concurrently twisting and winding different diameter wires form the inner layer to the outer layer around each other, with the same pitch in the longitudinal direction of the cable. For example, the first layer to the third layer: the inner layer (the first layer) arranged with the slotted fiber optic wires having the basic structures, the next outside middle layer (the second layer), and the next outside outermost layer (the third layer), can be formed by being twisted and wound around each other at the same pitch along the longitudinal direction of the cable. The parallel-lay strand having such a configuration is also referred to as "line contact strand" because each metal wire is in so-called "line contact" with each other. Specifically, the second layer is overlapped along the valleys of the first layer and the third layer is overlapped along the valleys of the second layer, so that each layer are arranged tightly. As a result, the parallel-lay strand has merits that make difficult the occurrence of breakage due to mutual wear or metal fatigue of each slotted fiber optic wire 1, and has a characteristic that makes difficult the occurrence of shape loss or deformation, thus leading to improvement in resistance to breakage. While there is a method of strengthen the coupling between the layers using different diameter wires constituting the strand, the method has been traditionally well known in the field of cable structures including no optical fiber, thus omitting its detail explanation here.

Incidentally, a recent study shows that Brillouin and Rayleigh scattering frequency changes of pulse laser light emitted into an optical fiber, caused by optical-fiber deformation produced by deformation of a shaped body encapsulating the optical fiber due to an external pressure, are expressed by the following fundamental formulas (1) and (2), respectively (see Patent Document 3):

$$\Delta v_B = C_{11}\Delta\varepsilon + C_{12}\Delta T + C_{13}\Delta P \quad (1),$$

where $C_{11}, C_{12}, C_{13}$ are respective sensitivity coefficients for Brillouin scattering frequency change due to strain change, temperature change, and pressure change of the optical fiber, and $$\Delta v_R = C_{21}\Delta\varepsilon + C_{22}\Delta T + C_{23}\Delta P \quad (2),$$

where $C_{21}, C_{22}, C_{23}$ are respective sensitivity coefficients for Rayleigh scattering frequency change due to strain change, temperature change, and pressure change of the optical fiber.

A description will be made in turn below that the application of the above fundamental formulas to the DPTS sensing cable proposed this time allows for measuring continuous distributions of pressure, temperature, and strain of a desired measurement object. When an optical fiber is deformed along with a steel wire or the like to which the fiber is coupled, the deformation of the optical fiber coincides with that of the steel wire because the stiffness of the steel wire is much larger than that of the optical fiber. Considering the pressure change term only according to a recent study of the inventors and letting the coefficient for volume change be $\beta$, the Rayleigh scattering frequency change due to pressure change of the optical fiber is expressed as the following expression (3):

$$\Delta v_R = (C_{23} + \beta C_{21})\Delta P \quad (3).$$

Here, letting the sensitivity coefficient $C_{23} + \beta C_{21}$ expressing the connection between $\Delta v_R$ and $\Delta P$ be rolled a new into a coefficient $K_{23}$, the coefficient $K_{23}$ obtained such as from measurement in water showed a characteristic as shown in FIG. 3. The sensitivity coefficient varies depending on materials to which the optical fiber is coupled, and showed a lowest sensitivity for steel and the next lowest one for aluminum and showed a highest sensitivity for a case of the optical fiber not being coupled (having a coupling-free structure).

Further, it is known that if an appropriate coupling material is chosen, the following expression (4) may, in some cases, hold true in Rayleigh scattering:

$$C_{23} \cong -\beta C_{21} \quad (4).$$

Namely, it is known that Rayleigh scattering may, in some cases, have a characteristic of no frequency change even when the optical fiber is subjected to a pressure change. Hence, it is important in an actual measurement to choose, in response to a required precision, such a structure as described above that increases the sensitivity coefficient.

Since the embodiment 1 does not employ a traditional type FIMT, it is impossible to evaluate strain and the like using directly the above fundamental formulas (1) and (2). Hence, evaluation expressions usable in the present embodiment are firstly derived from the above fundamental formulas (1) and (2). The following describes as an example a combination of optical fibers in two types of metal wires: the above-mentioned P-fiber in the type-1 structure and B-fiber in the type-1 structure.

Assuming the fiber elements of the P-fiber and the B-fiber are the same, from the fundamental formulas (1) and (2), the following expressions (5) to (8) are hold true for each fiber:

$$\Delta v_B^P = C_{11}\Delta\varepsilon^P + C_{12}^P\Delta T + C_{13}^P\Delta P \quad (5),$$

$$\Delta v_R^P = C_{21}\Delta\varepsilon^P + C_{22}^P\Delta T + C_{23}^P\Delta P \quad (6),$$

$$\Delta v_B^B = C_{11}\Delta\varepsilon^B + C_{12}^B\Delta T + C_{13}^B\Delta P \quad (7), \text{ and}$$

$$\Delta v_R^B = C_{21}\Delta\varepsilon^B + C_{22}^B\Delta T + C_{23}^B\Delta P \quad (8),$$

where the superscript notations P and B and the subscript notations B and R in each expressions stand for the P-fiber, the B-fiber, Brillouin scattering and Rayleigh scattering, respectively.

The coefficients listed in (9) and (10) below represent tangents in the expressions connecting temperature and frequency shift, and pressure and frequency shift measured when a temperature or a pressure is imposed on the P-fiber and the B-fiber being free from tension and the other forces.

$$C_{12}^P, C_{22}^P, C_{13}^P, C_{23}^P \quad (9), \text{ and}$$

$$C_{12}^B, C_{22}^B, C_{13}^B, C_{23}^B \quad (10).$$

These coefficients include strain components produced by thermal expansion due to temperature and produced by volume compression due to pressure. Accordingly, the values for the coefficients of the P-fiber and the B-fiber are different from each other.

To consider the influences of these strains, letting the coefficients due to thermal strain and volume compression be $\alpha$ and $\beta$, respectively, each coefficient listed in (9) and (10) can be separated into a term (not including the coefficients $\alpha$ nor $\beta$) intrinsic to the optical fiber, a term (including the coefficient $\alpha$) due to thermal strain, and a term (including the coefficients $\beta$) due to volume change, and can be expressed by the following expressions (11) to (18).

$$C_{12}^P = C_{12}^I + \alpha^P C_{11} \quad (11),$$

$$C_{22}^P = C_{22}^I + \alpha^P C_{21} \quad (12),$$

$$C_{13}^P = C_{13}^I + \beta^P C_{11} \quad (13),$$

$$C_{23}^P = C_{23}^I + \beta^P C_{21} \quad (14),$$

$$C_{12}^B = C_{12}^I + \alpha^B C_{11} \quad (15),$$

$$C_{22}^B = C_{22}^I + \alpha^B C_{21} \quad (16),$$

$$C_{13}^B = C_{13}^I + \beta^B C_{11} \quad (17), \text{ and}$$

$$C_{23}^B = C_{23}^I + \beta^B C_{21} \quad (18).$$

Using the expressions (11) to (18), the expressions (5) to (8) are expressed by the following expressions (19) to (22), respectively:

$$\Delta v_B^P = C_{11}(\Delta\varepsilon^P + \alpha^P\Delta T + \beta^P\Delta P) + C_{12}^I\Delta T + C_{13}^I\Delta P \quad (19),$$

$$\Delta v_R^P = C_{21}(\Delta\varepsilon^P + \alpha^P\Delta T + \beta^P\Delta P) + C_{22}^I\Delta T + C_{23}^I\Delta P \quad (20),$$

$$\Delta v_B^B = C_{11}(\Delta\varepsilon^B + \alpha^B\Delta T + \beta^B\Delta P) + C_{12}^I\Delta T + C_{13}^I\Delta P \quad (21), \text{ and}$$

$$\Delta v_R^B = C_{21}(\Delta\varepsilon^B + \alpha^B\Delta T + \beta^B\Delta P) + C_{22}^I\Delta T + C_{23}^I\Delta P \quad (22).$$

Next, obtaining of $\Delta T$ and $\Delta P$ using the above expressions is considered, i.e., using measurement values of Brillouin scattering frequency shift and Rayleigh scattering frequency shift on the left hand side of each expression and using the value of each known sensitivity coefficients ($C_{11}$ and the others). From the above expressions (5) and (6), the following expression (23) is obtained:

$$\Delta v_R^P - \frac{C_{21}}{C_{11}}\Delta v_B^P = \left(C_{22}^P - \frac{C_{21}}{C_{11}}C_{12}^P\right)\Delta T + \left(C_{23}^P - \frac{C_{21}}{C_{11}}C_{13}^P\right)\Delta P. \quad (23)$$

Further, using the above expressions (19) and (20), the following expression (24) is obtained:

$$\Delta v_R^P - \frac{C_{21}}{C_{11}}\Delta v_B^P = \left(C_{22}^I - \frac{C_{21}}{C_{11}}C_{12}^I\right)\Delta T + \left(C_{23}^I - \frac{C_{21}}{C_{11}}C_{13}^I\right)\Delta P \quad (24)$$

Likewise, from the expressions (7) and (8), the following expression (25) is obtained:

$$\Delta v_R^B - \frac{C_{21}}{C_{11}}\Delta v_B^B = \left(C_{22}^B - \frac{C_{21}}{C_{11}}C_{12}^B\right)\Delta T + \left(C_{23}^B - \frac{C_{21}}{C_{11}}C_{13}^B\right)\Delta P. \quad (25)$$

Further, using the above expressions (21) and (22), the following expression (26) is obtained:

$$\Delta v_R^B - \frac{C_{21}}{C_{11}}\Delta v_B^B = \left(C_{22}^I - \frac{C_{21}}{C_{11}}C_{12}^I\right)\Delta T + \left(C_{23}^I - \frac{C_{21}}{C_{11}}C_{13}^I\right)\Delta P. \quad (26)$$

It seems that $\Delta T$ and $\Delta P$ would be obtained independently by simultaneously solving the expressions (23) and (25). However, it is found that $\Delta T$ and $\Delta P$ cannot be obtained independently of each other because the right hand sides of the expressions (23) and (25) are equivalent to those of the expressions (24) and (26), respectively, and the right hand side of the expression (24) and that of the expression (26) are exactly the same. In short, $\Delta T$ and $\Delta P$ cannot be obtained from the above expressions.

Hence, it is found that the following idea needs to be introduced to solve this problem. While the pressure received by the B-fiber has been expressed as $\Delta P$, a pressure $\Delta P_1$ actually received by the B-fiber when it is enclosed with a stiffer material than the fiber is considered generally to have the following relation (27):

$$\Delta P_1 < \Delta P \quad (27), \text{ and}$$

That is, the following expression (28) generally holds true for the B-fiber:

$$\Delta P_1 = k\Delta P \quad (0 \leq k < 1) \quad (28)$$

In addition, k may be set to one (k=1) for the P-fiber.

Thus, considering deformation of the metal wire due to $\Delta P$, the Brillouin frequency shift due to the pressure only in the B-fiber is expressed by the following expression (29):

$$\Delta v_B^B = C_{13}^I k\Delta P + C_{11}\beta^B\Delta P \quad (29)$$

Here, the true sensitivity coefficient for Brillouin frequency change due to pressure change only in the optical fiber can be expressed by substituting the left coefficient for $\Delta P$ as the left hand side of the expression (30):

$$C_{13}^{II} = kC_{13}^I \quad (30)$$

Likewise, the true sensitivity coefficient for Rayleigh frequency change due to pressure change only in the optical fiber is expressed as the expression (31):

$$C_{23}^{II} = kC_{23}^I \quad (31)$$

In addition, a traditional FIMT can be regarded as an example of an extreme case of k=0 in the expressions (30) and (31).

In order to make more visible the strain-eliminated expression (24) for the P-fiber, by substituting simplified symbols for the coefficients using expressions (30) and (31), the expression (24) is expressed as the expression (32):

$$\Delta v_R^P - S\Delta v_B^P = R\Delta T + Q_1\Delta P \quad (32).$$

Likewise, the expression (26) for the B-fiber is expressed as the expression (33):

$$\Delta v_R^B - S\Delta v_B^B = R\Delta T + Q_2\Delta P \quad (33).$$

In the above expressions, S, R, $Q_1$, and $Q_2$ are as follows:

$$S = \frac{C_{21}}{C_{11}}, \quad (34)$$

$$R = C_{22}^I - SC_{12}^I (= C_{22}^P - SC_{12}^P = C_{22}^B - SC_{22}^B) \quad (35),$$

$$Q_1 = C_{23}^I - SC_{13}^I (= C_{23}^P - SC_{13}^P = C_{23}^B - SC_{23}^B) \quad (36), \text{ and}$$

$$Q_2 = kQ = C_{23}^{II} - SC_{13}^{II} \quad (37).$$

Since each right hand side of the above expressions (32) and (33) are different from each other, it is found that $\Delta T$ and $\Delta P$ can be obtained independently of each other. Namely, concurrently using the P-fiber and the B-fiber of the embodiment 1 allows for obtaining the temperature and pressure distributions of the measurement object.

To summarize the above, from the expressions (19) to (21), the expressions (30) and (31), and other expressions, Brillouin scattering frequency change and Rayleigh scattering frequency change in the P-fiber and the B-fiber are ultimately expressed as the following expressions (38) to (41):

$$\Delta v_B^P = C_{11}\Delta\varepsilon^P + C_{12}^I\Delta T + C_{13}^I\Delta P \quad (38),$$

$$\Delta v_R^P = C_{21}\Delta\varepsilon^P + C_{22}^I\Delta T + C_{23}^I\Delta P \quad (39),$$

$$\Delta v_B^B = C_{11}\Delta\varepsilon^B + C_{12}^{II}\Delta T + C_{13}^{II}\Delta P \quad (40), \text{ and}$$

$$\Delta v_R^B = C_{21}\Delta\varepsilon^B + C_{22}^{II}\Delta T + C_{23}^{II}\Delta P \quad (41).$$

In the above expressions, each sensitivity coefficient for $\Delta T$ and $\Delta P$ satisfy the following relations (42):

$$C_{12}^I \neq C_{12}^{II}, \ C_{22}^I \neq C_{22}^{II}, \ C_{13}^I \neq C_{13}^I \neq C_{13}^{II}, \ C_{23}^I \neq C_{23}^{II} \quad (42).$$

Further, $\Delta\varepsilon^P$ and $\Delta\varepsilon^B$ are expressed by the following expressions (43) and (44):

$$\Delta\varepsilon^P = \Delta\varepsilon_P + \alpha^P \Delta T + \beta^P \Delta P \quad (43), \text{ and}$$

$$\Delta\varepsilon^B = \Delta\varepsilon_B + \alpha^B \Delta T + \beta^B \Delta P \quad (44).$$

It is confirmed from the expressions (38) to (41) that the B-fiber and the P-fiber have different sensitivity coefficients for $\Delta T$ and $\Delta P$. Thus, by using two kinds of optical fibers such as the P-fiber and the B-fiber, each of Brillouin scattering frequency changes and Rayleigh scattering frequency changes due to temperature and pressure changes in these fibers are measured, and since these four frequency changes are expressed by the expressions (38) to (41), $\Delta T$ and $\Delta P$ can be determined from expressions connecting $\Delta T$ and $\Delta P$ (simultaneous equations with two unknown $\Delta T$, $\Delta P$) obtained by eliminating the strain changes $\Delta\varepsilon^P$ and $\Delta\varepsilon^B$ from these expressions.

After all, the example of the embodiment 1 that realizes the fundamental expressions (38) to (41) is the DPTS sensing cable shown in FIGS. 2A to 2D. That is, the Brillouin and Rayleigh scattering frequency changes due to pressure change and the like of measurement object are measured with both P-fiber in the first basic structure and B-fiber in the second basic structure.

Then, $\Delta\varepsilon$, $\Delta T$, and $\Delta P$ are determined by solving simultaneously the expressions (38) to (41) using sensitivity coefficients obtained beforehand for $\Delta\varepsilon$, $\Delta T$, and $\Delta P$, whereby values of pressure, temperature, and stain are obtained at a given position along the fiber optic cable and values thereof at other multiple points along the cable other are obtained in the same manner. After all, the distributions of pressure, temperature, and strain of the measurement object can be determined.

As described above, use of the slotted fiber optic wire 1 not only overcomes demerits entailed in use of a traditional FIMT, such as difficulty in assembly improvement and loss of the pressure blocking capability due to a pinhole, but also enables of the continuous strain distribution measurement that is a disadvantage of a traditional method of providing coupling points. Moreover, the slotted fiber optic wire has the structure only encapsulating the optical fiber into the slot groove extended along in an outer circumference such as of a steel wire having a diameter large than that of traditional one (its diameter may be supposed to be that of, for example, the dummy cable shown in FIG. 2D). Thus, the DPTS sensing cable is relatively easy to fabricate.

Figure 4:
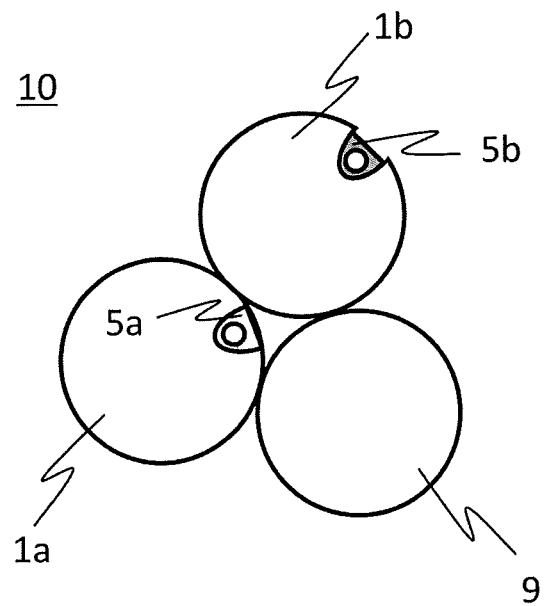
FIG. 4 is a diagram showing another exemplary configuration of the DPTS sensing cable according to the embodiment 1 of the present invention.

While the above has described about the DPTS sensing cable having a multilayered strand structure, the structure of the cable is not limited to this. It goes without saying that only the first layer as shown in FIG. 4 including the two types of slotted fiber optic metal wires helically twisted around each other, which is the inner layer shown in FIG. 2A, also brings about the same effect. Further, the DPTS sensing cable 10 thus configured can be more easily fabricated and can readily cope with a case where the specification of the DPTS sensing cable needs to be altered such as when the measurement object is changed. In addition, the configuration not with two metal wires but with three metal wires is for bringing the wires into line contact with each other to stabilize the structure of the DPTS sensing cable. This is due the fact that the three-wire configuration provides characteristics that make difficult the occurrence of breakage due to mutual wear or fatigue of each metal wire and the occurrence of shape loss or deformation, thus leading to improvement in resistance to breakage.

In addition, the fundamental expressions (40) and (41) for the measurement show that the strain produced in the optical fiber is directly equal to the strain of the slotted fiber optic wire. Hence, it should be noted again here that the strain of the measurement object is faithfully transferred to the strain produced in the B-fiber. While the above has describes that the slotted fiber optic wire has the U-shaped slot groove for encapsulating the optical fiber, the shape is not limited to this. The same effect is brought about as long as the slot groove has a concave shape.

Figure 5:
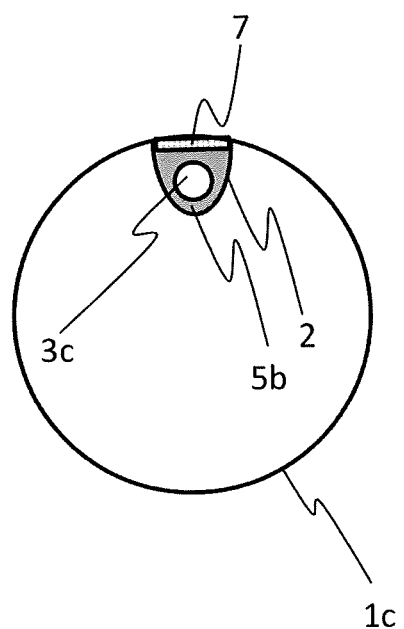
FIG. 5 is a diagram showing another exemplary basic structure of the slotted fiber optic wire used for the DPTS sensing cable according to the embodiment 1 of the present invention.

Further, while the U-shaped slot groove 2 for encapsulating the optical fiber is described in the above as having the depression in the opening thereof, the slot groove is not limited to this. As shown in FIG. 5, a slotted fiber optic wire 1c encapsulating the optical fiber 3c in the slot groove 2 whose depression opening is covered with a chemical protective layer 7 formed such as of resin, also exhibits the same effect as with the case of employing the slotted fiber optic wires 1a and 1b for the DPTS sensing cable. Moreover, the slotted fiber optic wire having the slot groove covered with chemical protective layer 7 as shown in FIG. 5 can effectively block infiltration such as of hydrogen gas into the inside, thereby bringing about an effect of preventing performance degradation of the optical fiber 3c. In addition, each wire constituting the above-described outer layer: the middle layer or the outermost layer, may be any of the dummy cable 9 and the slotted fiber optic wire 1 (1a to 1c and 1e; a slotted fiber optic wire 1e is described later).

The stress closely related to the strain of the optical fiber encapsulated in the U-shaped slot groove of the slotted fiber optic wire is evaluated here by a three-dimensional simulation analysis. The simulation result is described below with reference to the relevant figures. The simulation analysis uses a model in which the shape of the slotted fiber optic wire is divided into a grid pattern. In the model, the grid interval in a region near the optical fiber is set particularly finer than that in the other region in the optical fiber holder. The stress is simulated three-dimensionally using the grid pattern thus set in the model.

Figure 6B:
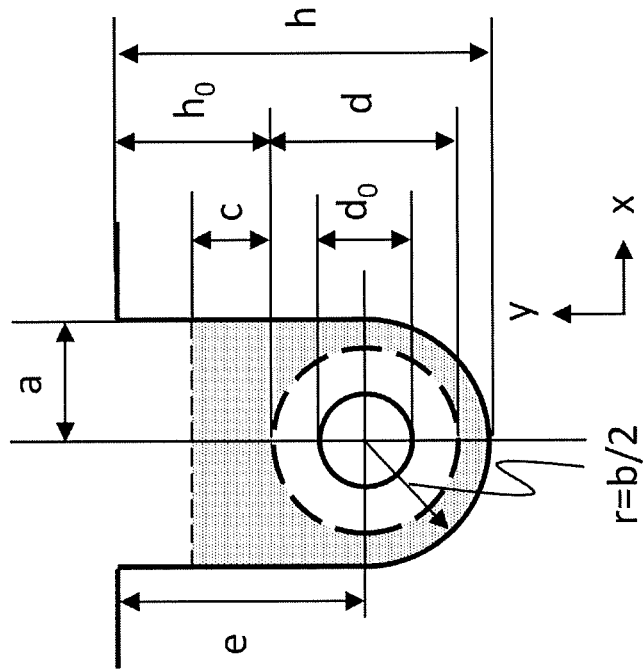
FIGS. 6A, 6B are diagrams for explaining basic structure parameters used in a stress simulation of the slotted the fiber optic wire.
Figure 6A:
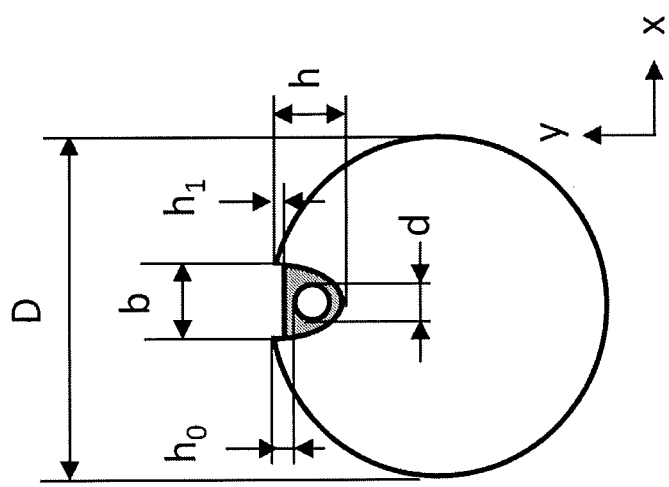

FIGS. 6A, 6B are diagrams in cross section perpendicular to the axis of the slotted fiber optic wire, showing a shape model used in the simulation to explain each of parameters used therein. FIG. 6A is a diagram for explaining main parameters for the simulation model, and FIG. 6B is an enlarged diagram of a portion relevant to the optical fiber holder shown in FIG. 6A, for further explaining in detail the shape parameters for the optical fiber holder. In the figures, D expresses the outer diameter of the slotted fiber optic wire; h, the depth of the slot groove; b, the width of the opening of the U-shaped slot groove; c, the thickness of the adhesive; d, the outer diameter of the optical fiber including the coat; $d_0$, the clad diameter of the optical fiber; e, the distance from the outer surface of the slotted fiber optic wire to the center of the optical fiber. Further, the material of the slotted fiber optic wire is assumed to be copper. The coordinate system is defined as shown in the figure, in which the right direction of the x-axis is positive and the upper direction of y-axis is positive. In addition, the z-direction is perpendicular to the drawing sheet (the upward direction from sheet is defined positive) and corresponds to the longitudinal direction of the slotted fiber optic wire.

Figure 7:
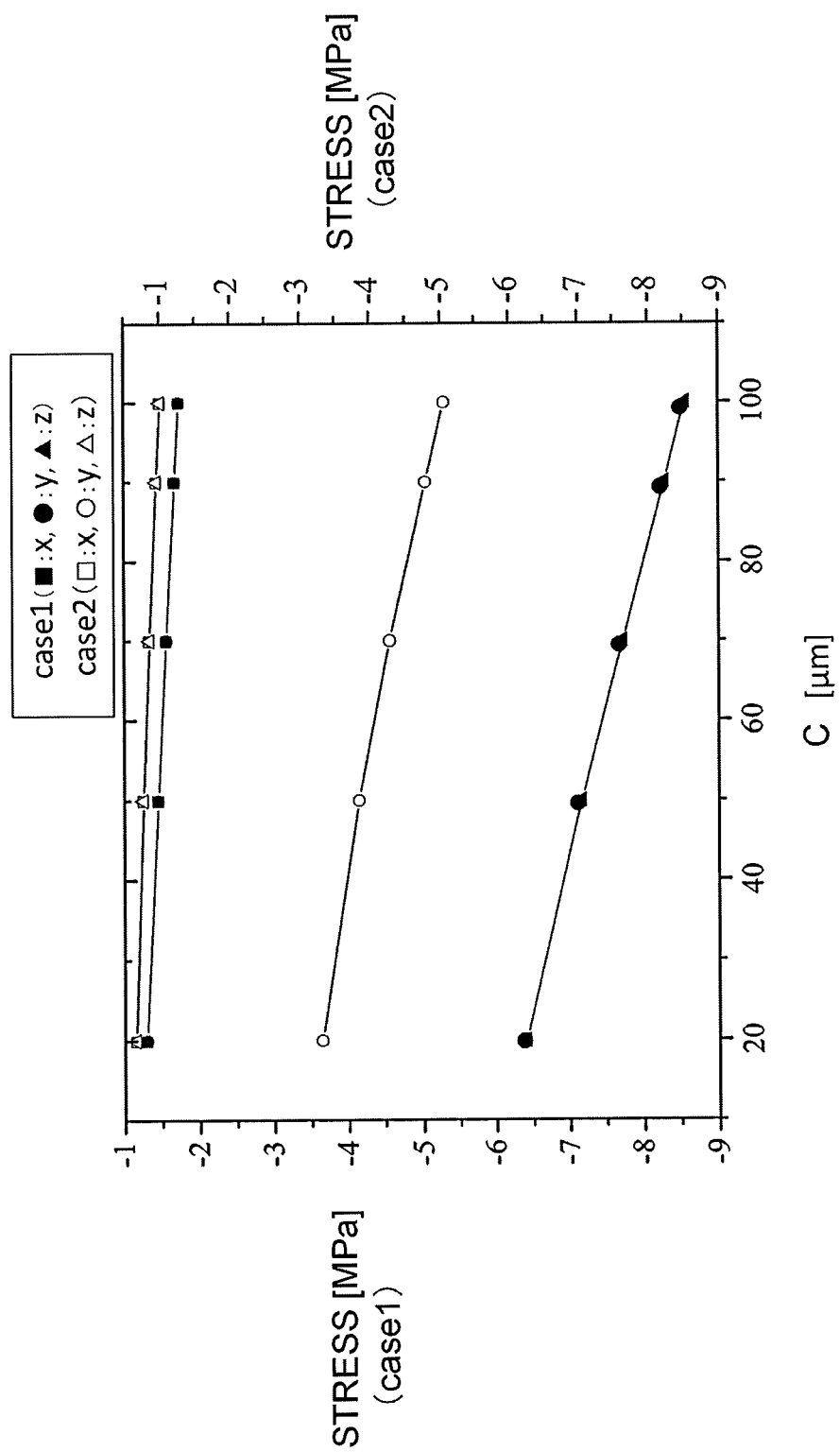
FIG. 7 is a graph showing an example of the stress simulation result.

FIG. 7 shows an exemplary simulation result when an external pressure is exerted. Two cases are taken in the figure for comparison, i.e., a case 1: an optical fiber having an elastic modulus of 3.2 GPa and a Poisson ratio of 0.35 and a case 2: an optical fiber having an elastic modulus of 0.3 GPa and a Poisson ratio of 0.45 (a liquid-like property). The stresses in the x-, y-, and z-directions are shown in the figure for the cases 1 and 2 by taking as the horizontal axis the thickness c (see FIG. 6B) of the adhesive (epoxy resin in this example).

The simulation result shows that compressive stresses are exerted in every direction because all stresses have negative values. While the x- and y-direction stresses in the case 2 have closer values to each other than those in the case 1, it is fair to say that the stresses in both cases are substantially isotropic (the values of stresses in the x- and y-directions are substantially the same). Thus, the numerical analysis corroborates that the DPTS sensing cable using the slotted fiber optic wires encapsulating the optical fibers, which is described in the embodiment 1, also allows for appropriately measuring a strain distribution. In addition, parameter values used in the simulation are D=1.5 mm, b=0.3 mm, d=0.25 mm, $d_0$=0.125 mm, and h=0.6 mm.

While distributions of temperature and pressure of the measurement object are measurable using Brillouin and Rayleigh scattering frequency changes as described above, the sensitivity coefficients for ΔT and ΔP are characterized as being different not only from traditional ones but also between the B-fiber and the P-fiber, as seen from the comparison between expressions (38) to (41) and fundamental formulas (1) and (2). Thus, in the embodiment 1, measurement values of Brillouin and Rayleigh scattering frequency changes need to be evaluated with these differences in mind.

The above description has been made by taking a single core optical fiber as an example, the optical fiber is not limited to this. The measurement may in some cases implemented by employing a multicore optical fiber. In that case, since it can be assumed that strain, temperature, and pressure are respectively the same as those of each core in the optical fiber, the same discussion as with the single-core optical fiber holds true by regarding the strain, temperature, and pressure in each relevant expression shown in the above as those in each core of the optical fiber. Thus, the multicore optical fiber is excellent in quick measurement because it enables a plurality of instruments to be directly connected thereto at the same time via no optical switch.

Embodiment 2

The above embodiment 1 has described an example of the DPTS sensing cable 10 that is configured in the multilayered strand structure 6 by arranging the two types of metal wires concentrically with respect to the cable center. The difference in pressure sensitivity between the two types of metal wires is not due to the influence of the optical fibers themselves but mainly due to the difference between the optical fiber holders. In the embodiment 2, the two types of the metal wires encapsulate two kinds of optical fibers, respectively, having pressure coefficients different by, for example, about one order magnitude from each other, so that the two types of metal wires exhibit pressure coefficient characteristics different from each other not because of the difference between the optical fiber holders but because of the large influence due to the difference in characteristics of the optical fibers themselves. Using the DPTS sensing cable thus configured allows for bringing about an effect the same as with the embodiment 1. Hereinafter, the present embodiment is described in detail with reference to the relevant figures.

Figure 8C:
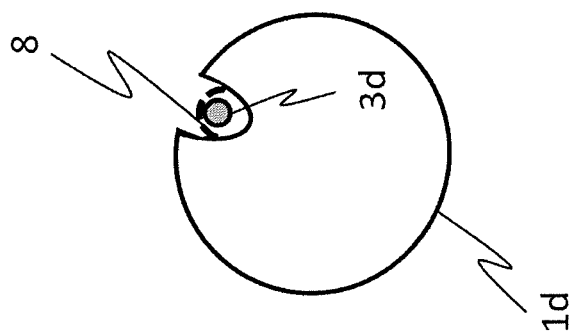
FIGS. 8A, 8B, 8C are diagrams showing an exemplary configuration of a DPTS sensing cable according to the embodiment 2 of the present invention.
Figure 8B:
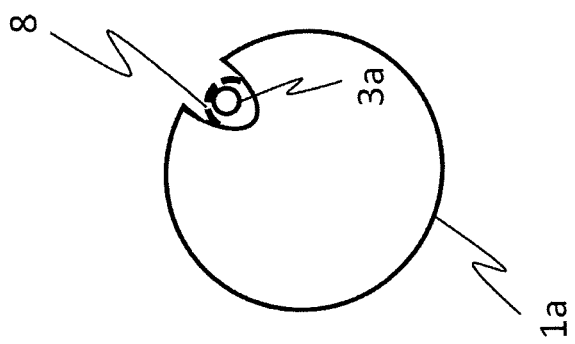
Figure 8A:
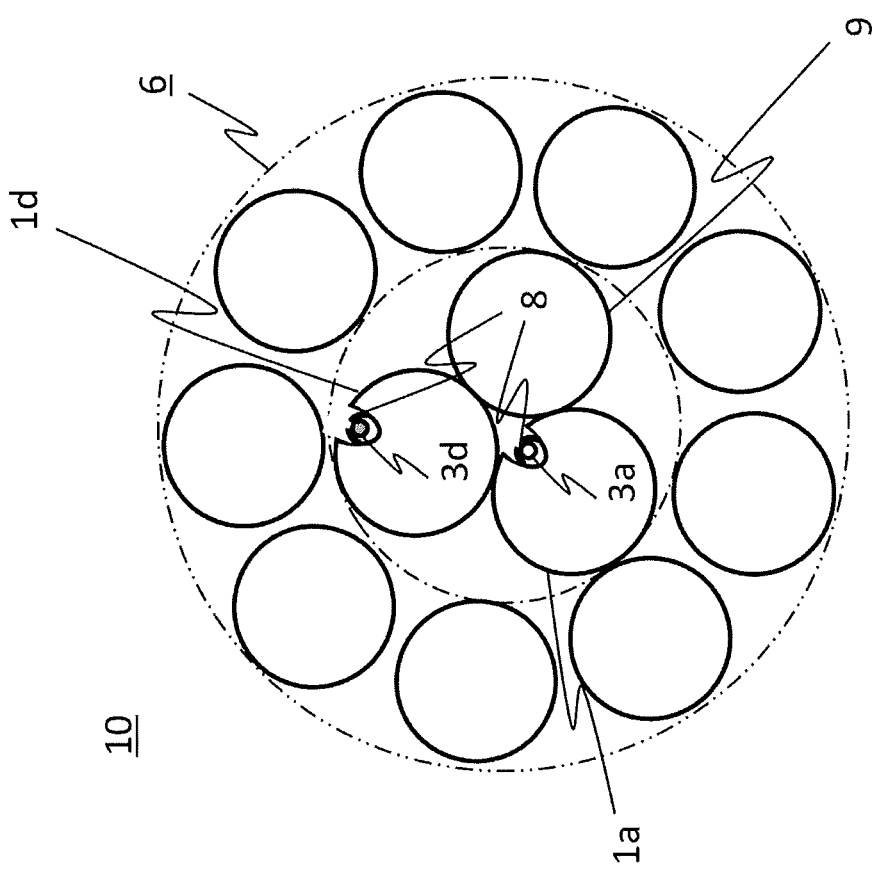

An exemplary configuration of the DPTS sensing cable 10 according to the embodiment 2 is shown in FIGS. 8A, 8B, 8C. In FIGS. 8A, 8B, 8C, the DPTS sensing cable is configured in a strand structure as a whole, that is, its inner layer (the first layer) includes total three metal wires: two slotted fiber optic wires having basic structures and one dummy cable 9 described in the embodiment 1, and its outer layer (the second layer) is configured as same as with the embodiment 1.

The optical fiber 3a is encapsulated with the coupling-free structure, as with the embodiment 1, in the slotted fiber optic wire 1a (also referred to as "type 3" hereinafter), which is one of the two slotted fiber optic wires, and an optical fiber 3d different from that in the embodiment 1 is encapsulated with the coupling-free structure in another slotted fiber optic wire 1d (also referred to as "type 4" hereinafter). The embodiment 2 is different in this point from the embodiment 1. To be more specific, the optical fiber 3d has a pressure coefficient one order of magnitude larger than the optical fiber 3a (see, for example, Non-Patent Document 2 for such an optical fiber) and differs from the optical fiber 3a in this point. For such an optical fiber, the expression (28) described in the embodiment 1 also holds true, so that the DPTS sensing cable, as a whole, exhibits the same effect as with the embodiment 1.

The two slotted fiber optic wires constituting the DPTS sensing cable 10 of the present embodiment has the optical fiber holder the same as that for the P-fiber described in the embodiment 1. Thus, pressure change and temperature change of the measurement object can be measured with the slotted fiber optic wires. In addition, strain change as well as pressure change and temperature change of the measurement object can also be measured by providing additionally as an option an optical fiber coupling parts (described later in detail) designated at a reference numeral 8 in the figure.

Figure 9:
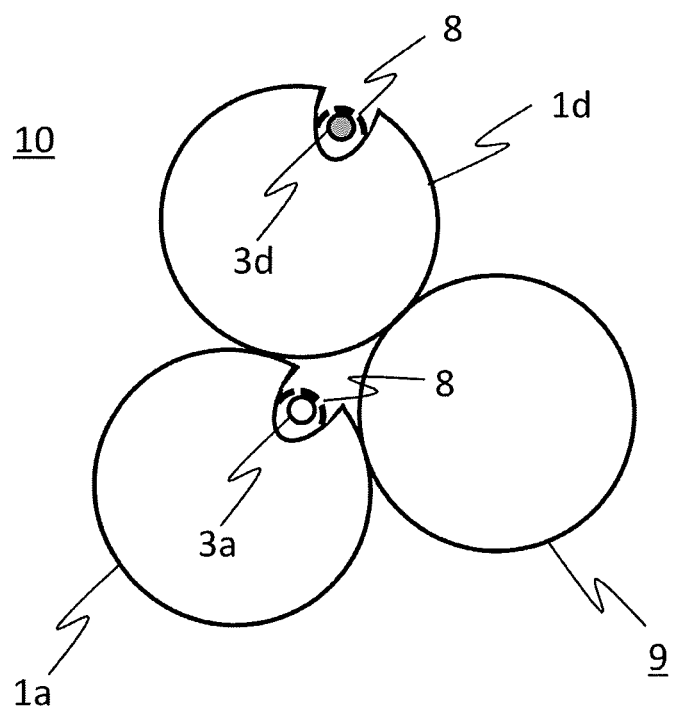
FIG. 9 is a diagram showing another exemplary configuration of the DPTS sensing cable according to the embodiment 2 of the present invention.

FIG. 9 shows another exemplary configuration of the DPTS sensing cable 10 according to the present embodiment, in which the three metal wires, among the metal wires shown in FIG. 8A, constituting the inner layer (the first layer) only are helically twisted around each other as shown in FIG. 4. Note that FIGS. 8A to 8C and FIG. 9 show cross sections of the DPTS sensing cable, taken along planes B1-B1 and B2-B2 perpendicular to the axis thereof shown in the later described FIGS. 10A and 10B, assuming these planes are on the same cross sectional plane. It goes without saying that the one layer including the two types of metal wires as shown in FIG. 9 also brings about the same effect as with that shown in FIG. 8A. Further, the DPTS sensing cable thus configured can be fabricated more easily compared with that configured as shown in FIG. 8A, and can readily cope with a case where the specification of the DPTS sensing cable needs to be altered such as when the measurement object is changed. In addition, the reason for configuring the first layer of the cable not with two wires but with three wires is the same as with the case of FIG. 4.

Next, a method of fabricating the slotted fiber optic wires shown in FIGS. 8A to 8C and FIG. 9 is described with reference to FIGS. 10A and 10B. The slotted fiber optic wires according to the present embodiment can be fabricated by the method schematically shown in FIGS. 10A and 10B. The method of fabricating the slotted fiber optic wires is outlined below with comparison between the slotted fiber optic wires 1a and 1d used in the present embodiment.

Figures 10A, 10B:
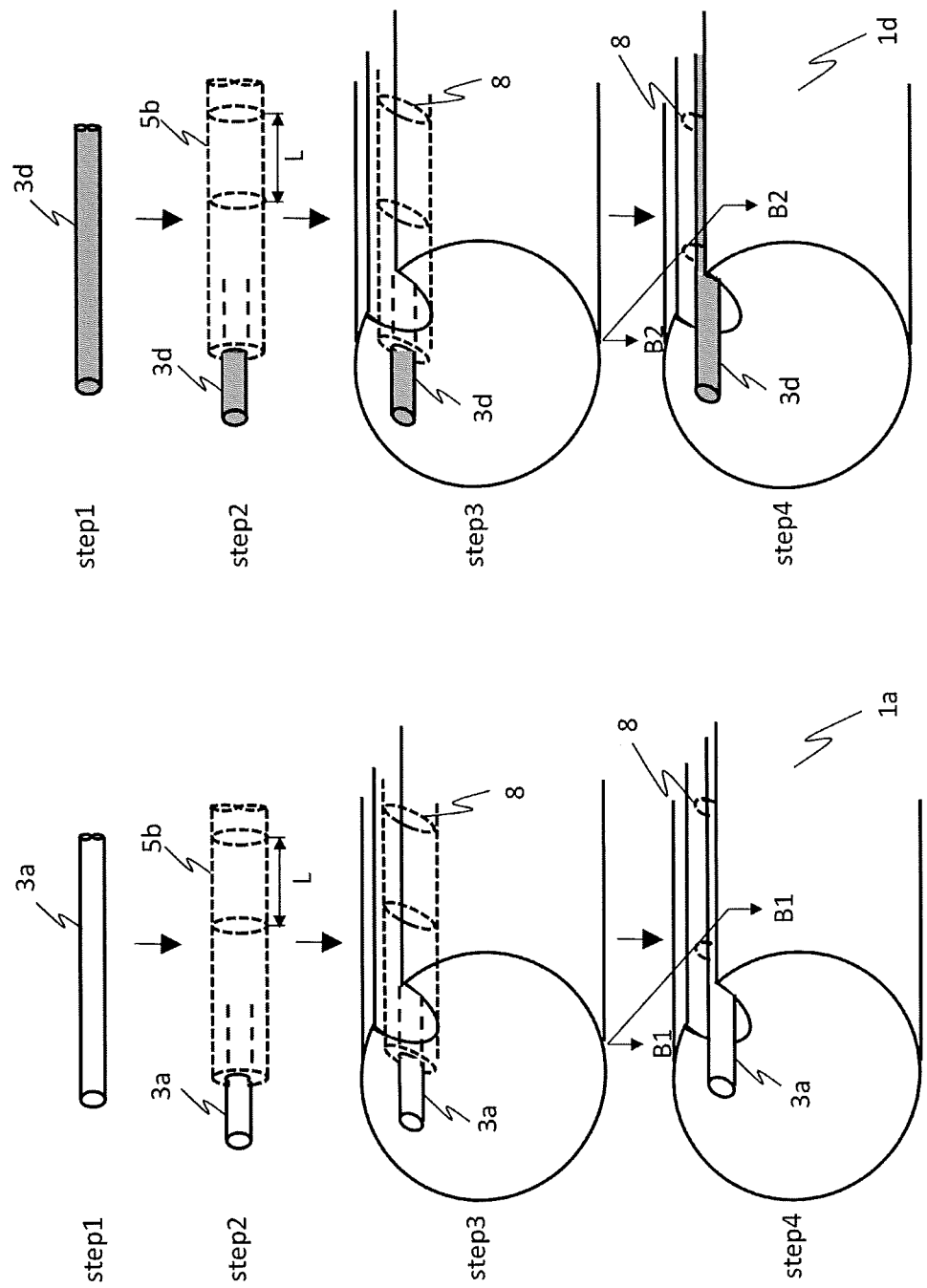
FIGS. 10A, 10B are diagrams for explaining a method of fabricating the slotted fiber optic wire used for the DPTS sensing cable according to the embodiment 2 of the present invention.

FIG. 10A shows exemplary steps of fabricating the slotted fiber optic wire 1a, and FIG. 10B shows exemplary steps of fabricating the slotted fiber optic wire 1d. The slotted fiber optic wire 1a is fabricated in order from Step 1 to Step 4 depicted schematically in FIG. 10. The optical fiber 3a having an ordinary pressure-sensitivity characteristic is employed as an optical fiber encapsulated in the slotted fiber optic wire (Step 1), and coated with a water-soluble coat 5*b* that partially has water-insoluble sections along the wire (Step 2), then inserted into the slot groove 2 in the fiber optic metal wire to be held (Step 3). After that, the water-soluble sections of the water-soluble coat 5*b* is dissolved into the liquid measurement object in actual use (Step 4), then the slotted fiber optic wire is actually used in the measurement.

While the water-soluble coat 5*a* described in the embodiment 1 is entirely formed of a water-soluble material, the water-soluble coat 5*b* shown in the figures is partially formed of a water-insoluble material although most part thereof is formed of a water-soluble material. Then at use time, the ring-like water-insoluble coat is turned into coupling parts 8 for coupling the optical fiber to the slot groove. The plurality of coupling parts 8 are formed at predetermined intervals L along the slotted fiber optic wire (see Step 2 in the FIG. 10A). After that, the optical fiber 3*a* coated with the water-soluble coat 5*b* is inserted into the slot groove of the metal wire. The water-soluble sections of the water-soluble coat 5*b* is dissolved into the liquid measurement object in actual use, so that the water-insoluble sections only remain as the coupling parts (see Step 4 in FIG. 10A). In addition, the planes B1-B1 and B2-B2 shown in respective Steps 4 of FIG. 10A and FIG. 10B represent the cross-sections of the metal wires perpendicular to the axis thereof.

The slotted fiber optic wire 1*d* is fabricated in order from Step 1 to Step 4 depicted schematically in FIG. 10B. Step 1 of employing, as an optical fiber encapsulated in the slotted fiber optic wire, the optical fiber 3*d* having the pressure sensitivity coefficient that is about one order of magnitude larger than an ordinary pressure sensitivity coefficient is only different from the fabrication step of the slotted fiber optic wire 1*a*, and the other steps are the same as those of the slotted fiber optic wire 1*a* (detail description is omitted).

While the two types of slotted fiber optic wires are described in FIGS. 10A and 10B as both having the coupling parts 8, the wires are not limited to those. Only either one of the two types of the wires may have the coupling parts 8. Further, both wires may have no coupling parts. Any of the wires brings about the same effect as with the embodiment 1.

Further, any of the type-3 wire, the type-4 wire, and the dummy cable 9 shown in the embodiment 1 may be employed as the metal wires other than the two types of slotted fiber optic metal wires shown in FIGS. 8B, 8C and FIG. 9. Employing any of the wires also brings about the same effect as with the embodiment 1.

As described above, the DPTS sensing cable according to the embodiment 2 includes at least one slotted fiber optic wire, among the three metal wires, having the basic structure. Moreover, by employing an optical fiber having the different characteristic in itself, the DPTS sensing cable is characterized in that it includes, except for the basic-structure slotted fiber optic wire, at least one slotted fiber optic wire that is different in its characteristic from the basic-structure slotted fiber optic wire.

While in the DPTS sensing cable according to the embodiment 2 thus configured, the same effect as with the embodiment 1 can be exhibited using the two slotted fiber optic wires having the basic structures encapsulating the optical fibers without the coupling parts, another effect can be brought about by using the slotted fiber optic wire that encapsulates the optical fiber having the coupling parts. This is explained blow.

Changes of strain, pressure, and temperature can be measured with, for example, the following two kinds of optical fibers: the strain change is directly measured with the optical fiber 3*a* shown in FIG. 10A having the coupling parts 8 encapsulated in the slotted fiber optic wire 1*a*, and pressure change and temperature change are measured with the optical fiber 3*d* shown in FIG. 10B encapsulated in a slotted fiber optic wire without coupling parts. Thus, since the two types of slotted fiber optic wires have the pressure-change and temperature-change sensitivity coefficients different from each other because of difference in characteristics of the respective optical fibers encapsulated therein, the fundamental expressions shown in the embodiment 1 hold true, so that distributions of pressure and temperature are obtained by measuring Brillouin scattering frequency changes and Rayleigh scattering frequency changes due to pressure and temperature changes of the two types of slotted fiber optic wires. Therefore, required distributions of temperature, pressure, and strain can be determined along with a strain distribution obtained by measurement with the slotted fiber optic wire 1*a*.

While the second embodiment 2 enables the measurement with the optical fiber having the coupling-free structure, an oil-soluble coat other than the water-soluble coat is also available in the fabrication for coating the optical fiber having the coupling-free structure. Accordingly, the latter is used for an oily measurement object such as in an oil well.

Embodiment 3

The embodiment 3 discusses about wire material, which is one of factors affecting the characteristic of the slotted fiber optic wire, and describes below an exemplary application of different material. The present embodiment uses a slotted fiber optic wire that is the same in its structure as with the embodiment 1 but different from the embodiment 1 in its material for forming the metal wire. Hereinafter, the embodiment 3 is described with reference to the relevant figures.

Figure 11:
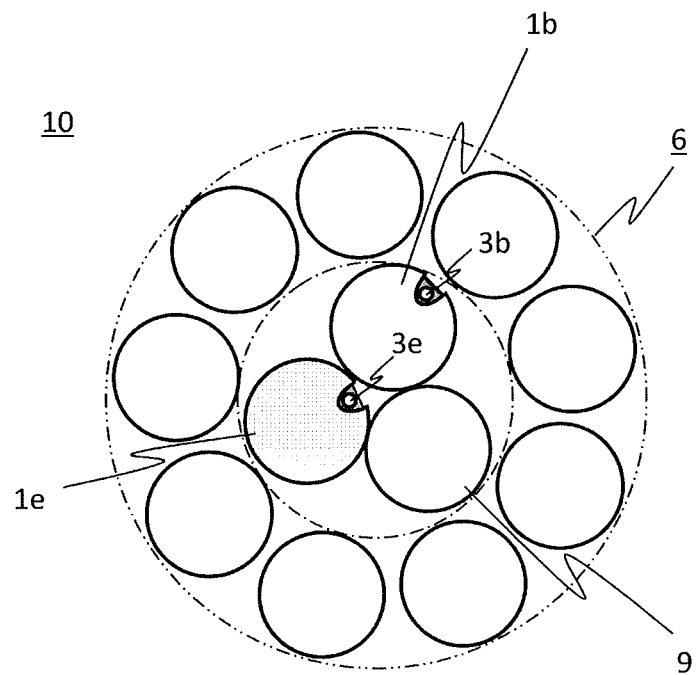
FIG. 11 is a diagram showing an exemplary configuration of a DPTS sensing cable according to the embodiment 3 of the present invention.

FIG. 11 shows an exemplary DPTS sensing cable cable 10 according to the embodiment 3. The embodiment 3 is different from the embodiment 1 in that the slotted fiber optic wire 1*e* is used instead of the slotted fiber optic wire 1*a*. Specifically, while the slotted fiber optic wire 1*e* is the same as the slotted fiber optic wire 1*b* of the embodiment 1 in that it uses the optical fiber holder 4 formed of the adhesive, the metal material for forming the slotted fiber optic wire 1*e* is essentially different from that for the slotted fiber optic wire 1*b*. For example, aluminum is used in the present embodiment whereas copper is used in the embodiment 1. Accordingly, the pressure-sensitivity characteristic of an optical fiber 3*e* used here is also different from that of the optical fiber 3*b* encapsulated in the slotted fiber optic wire 1*b*.

Letting pressure change that the B-fiber encapsulated in the slotted fiber optic wire 1*e* of different material is actually received be $\Delta P_2$, it is considered that $\Delta P_2$ is not expressed by the right hand side of the expression (28) shown in the embodiment 1 but by substituting $k_1$ that is different from k in the right hand side of the expression (28). That is, the following relation (45) holds true:

$$\Delta P_2 = k_1 \Delta P \quad (0 \le k_1 < 1) \tag{45}$$

where it is noted that k is not $k_1$ ($k \ne k_1$) in the above expression.

From this, it is found that the sensitivity coefficient for $\Delta P$ in the embodiment 3 is different from that in the embodiment 1. Thus, $\Delta T$ and $\Delta P$ each can be determined also for the case of employing the slotted fiber optic wire of different material as shown in FIG. 11. Note that while the dummy cable 9 is also shown in FIG. 11 as a third cable that is different from the two types of slotted fiber optic wires, the other one wire may be the same as any one thereof.

Figure 12:
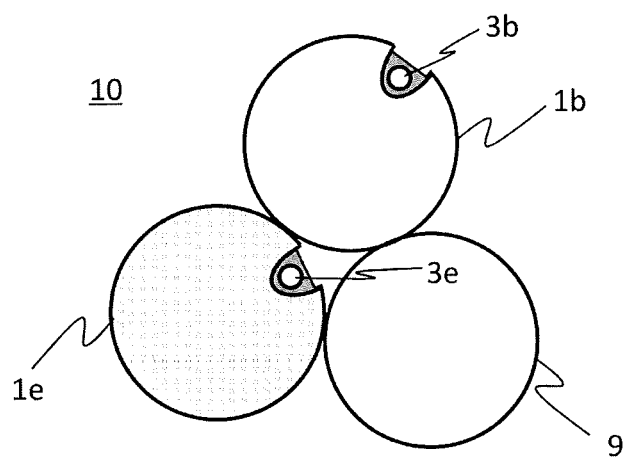
FIG. 12 is a diagram showing another configuration of the DPTS sensing cable according to the embodiment 3 of the present invention.

Moreover, while the multilayered strand-structure DPTS sensing cable is described in the above, the configuration thereof is not limited to this. It goes without saying that even a DPTS sensing cable shown in FIG. 12 configured with no outer layer (no second layer) brings about the same effect as with that shown in FIG. 11. Furthermore, the DPTS sensing cable 10 thus configured can be more easily fabricated, and can readily cope with a case where the specification of the DPTS sensing cable needs to be altered such as when the measurement object is changed.

As described above, using a DPTS sensing cable according to the embodiment 3 also allows for exhibiting the same effect as with the embodiment 1. Moreover, the configuration of the DPTS sensing cable according to the embodiment 3 eliminates the need of the process of coating the optical fiber with the water-soluble coat because no optical fiber having the coupling-free structure is used in the fabrication. This brings about effects of more simplifying the fabrication and of being able to obtain an advantage in cost.

It should be noted that the present invention is not limited to each embodiment described above and each embodiment may be freely combined or appropriately modified or omitted within the spirit and the scope of the invention. For example, the chemical protective layer shown in FIG. 5 can likewise be applied also to the slotted fiber optic wire described in the embodiment 3.

NUMERAL REFERENCE 1, 1a, 1b, 1c, 1d, 1e: slotted fiber optic wire;
2: slot groove;
3, 3a, 3b, 3c, 3d, 3e: optical fiber;
4: optical fiber holder;
5a: water-soluble coat (having no water-insoluble sections);
5b: water-soluble coat (having water-insoluble sections);
5c: adhesive;
5d: elastic material;
6: strand structure;
7: chemical protective layer;
8: coupling parts;
9: dummy cable; and
10: DPTS sensing cable.

The invention claimed is:

1. A distributed pressure, temperature, and strain (DPTS) sensing cable comprising:

a first optical fiber and a second optical fiber for measuring distributions of pressure, strain, and temperature of a measurement object on the basis of frequency changes in Brillouin and Rayleigh scattering of laser pulse light emitted into the first and second optical fibers;

a first slotted metal wire having a first slot groove extended along in an outer circumferential portion of the first metal wire to encapsulate the first optical fiber;

a second slotted metal wire having a second slot groove extended along in an outer circumferential portion of the second metal wire to encapsulate the second optical fiber; and both the first optical fiber and the second optical fiber receive some amount of pressure from the measurement object, wherein the first slotted metal wire with the first optical fiber has a pressure sensitivity characteristic for frequency changes in Brillouin and Rayleigh scattering different from the pressure sensitivity characteristic for frequency changes in Brillouin and Rayleigh scattering of the second slotted metal wire with the second optical fiber.

2. The DPTS sensing cable of claim 1, wherein the first optical fiber encapsulated in the first slot groove of the first slotted metal wire has a characteristic different from the second optical fiber encapsulated in the second slot groove of the second slotted metal wire.

3. The DPTS sensing cable of claim 1, wherein the first slotted metal wire is formed of a metal material different from the second slotted metal wire.

4. The DPTS sensing cable of claim 1, further comprising:
at least one layered strand-structure cable helically wound around the first and second slotted metal wires.

5. The DPTS sensing cable of claim 2, wherein both the first and second optical fibers encapsulated in the first and second slotted metal wires are each partially coupled to the respective first and second slotted metal wire by coupling parts formed in each of the first and second slot grooves.

6. The DPTS sensing cable of claim 1, wherein the first slotted metal wire has a chemical protective layer to cover an opening of the first slot groove.

7. The DPTS sensing cable of claim 1, wherein the first slotted metal wire comprises a water soluble coat encapsulating the first optical wire in the first slot groove.

8. The DPTS sensing cable of claim 7, wherein the second slotted metal wire comprises an adhesive encapsulating the second optical wire in the second slot groove.

* * * * *